Aug. 12, 1969  G. P. C. NIELSEN  3,460,402
COUPLING MECHANISM
Filed Aug. 21, 1967  2 Sheets-Sheet 1

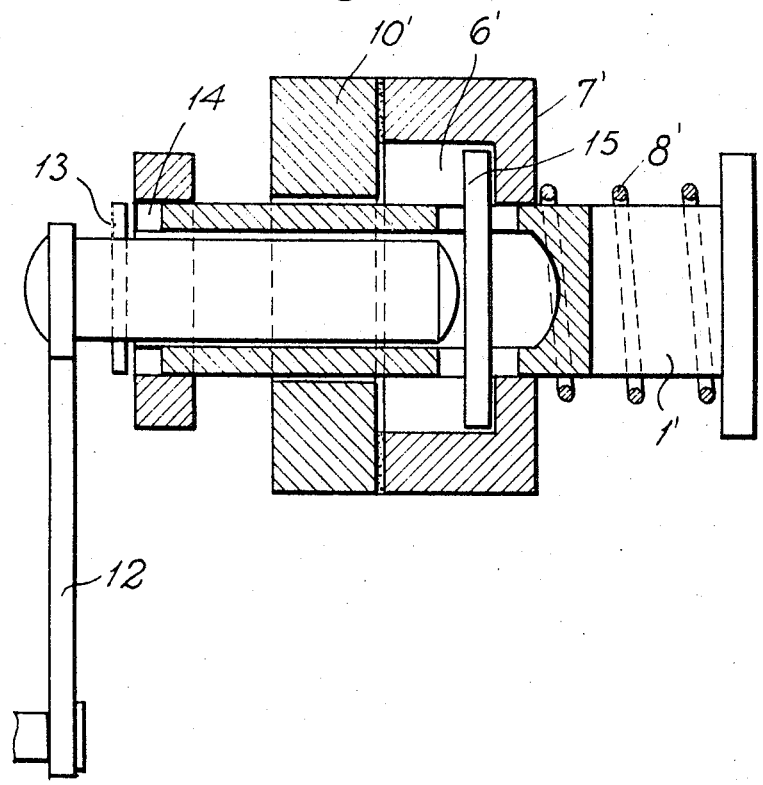

United States Patent Office 3,460,402
Patented Aug. 12, 1969

3,460,402
COUPLING MECHANISM
Georg Peter Christian Nielsen, Copenhagen, Denmark, assignor to Litollo A/S, Copenhagen, Denmark
Filed Aug. 21, 1967, Ser. No. 662,063
Claims priority, application Denmark, Sept. 14, 1966, 4,748/66
Int. Cl. G05g 1/02; F02n 1/02
U.S. Cl. 74—548          8 Claims

ABSTRACT OF THE DISCLOSURE

A hollow shaft carries a non-rotatable, but axially displaceable driven coupling half part which normally is spring actuated in engagement with a driving coupling half part on the same shaft. The hollow shaft can receive a crank handle having carrier members adapted to cooperate with carrier members on the shaft, when the inner end of the handle has displaced the driven coupling into its disengaged position overcoming the action of the spring.

BACKGROUND OF THE INVENTION

Field of the invention

The invention relates to a coupling mechanism with a driving coupling half which is freely rotatable on a shaft that is hollow at least at one end, and with a non-rotatable, but axially displaceable driven coupling half which is mounted on the same shaft and which in its coupled position is forced into engagement with the driving coupling half by a spring, while the shaft in its disengaged position may be turned manually by an operating member such as a crank handle which may be inserted into the hollow end of the shaft and has carrier members adapted to cooperate with carrier members provided on the shaft.

Description of the prior art

There is known a coupling mechanism of this kind, which, however is very complicated, since it has a separate changing mechanism to ensure that the driving motor is disengaged when a crank handle is engaged and vice-versa. There is furthermore another known, rather complicated coupling mechanism in which a complicated mechanism for engagement and disengagement of the crank handle is used with a separate coupling shaft having control means such as a cam disc and an eccentric for electrically cutting in and cutting out the motor.

These known coupling mechanism are, due to their complicated construction, too costly for use in many industries.

SUMMARY OF THE INVENTION

The object of the invention is to provide a simple coupling mechanism of the aforesaid kind with a shaft adapted to be rotated by a driving mechanism through the driving and the driven coupling halves, but which also in certain conditions, for example on failing electric supply, is capable of being rotated by a crank handle or a similar operating member after the coupling to the driving mechanism having been released.

An essential feature of the coupling mechanism according to the invention is that the carrier members of the operating member are adapted and mounted at a distance from the end of the operating member in such manner that they cannot mesh with the carrier members of the shaft until the inner end of the operating member, overcoming the action of a spring, has displaced the driven coupling half into its disengaged position.

Thus, very few and simple means ensure that the driving mechanism is temporarily disengaged while the manual operating member is being used, and that the crank handle is released when the driving mechanism is operating, the spring pushing the operating member out of its active position, simultaneously engaging the driven coupling half.

An essential feature of a preferred embodiment of the coupling mechanism according to the invention is that opposite the driven coupling half the shaft has diametrically opposed slits extending longitudinally in the wall surrounding the hollow space of the shaft, a pair of lever-like pawls being hinged to each other at the center line of the shaft and extending through the slits in the wall into narrow radial recesses provided in the driven coupling half, the distance from the end of the operating handle to its carrier members corresponding to the distance between the carrier members of the shaft and the inner end of the slits in the wall in such manner that the carrier members will not be in engagement until the inserted operating member has turned about the side edges of the slits by such an angle that their extreme ends have displaced the driven coupling half into its disengaged position.

The result obtained by this embodiment is that the driven coupling half may, without difficulty, be mounted closer to the free shaft end where the operating member is introduced whereas the driving coupling half and the driving mechanism may be mounted at greater distance from the shaft end, which in many cases may be necessary due to space.

Wherever space permits, a still simpler embodiment of the coupling mechanism according to the invention may be used. An essential feature of such embodiment is that the freely rotatable driving coupling half is mounted closer to the shaft end than the driven coupling half which is spring-activated in the direction towards the shaft end and is displaceable on the shaft, but retained nonrotatably by means of a pin possed through diametrically opposed slits provided in the wall of the hollow shaft and disposed in such manner that the said coupling half may be acted upon by the end of the operating member so as to displace the coupling half when the carrier members of the operating member and of the shaft are brought into engagement.

BRIEF DESCRIPTION OF THE DRAWING

The invention will now be described in more detail with reference to the drawing, in which FIGURE 3 is an axial section through another embodiment of the coupling mechanism according to the invention.

Detailed description

Figure 1:
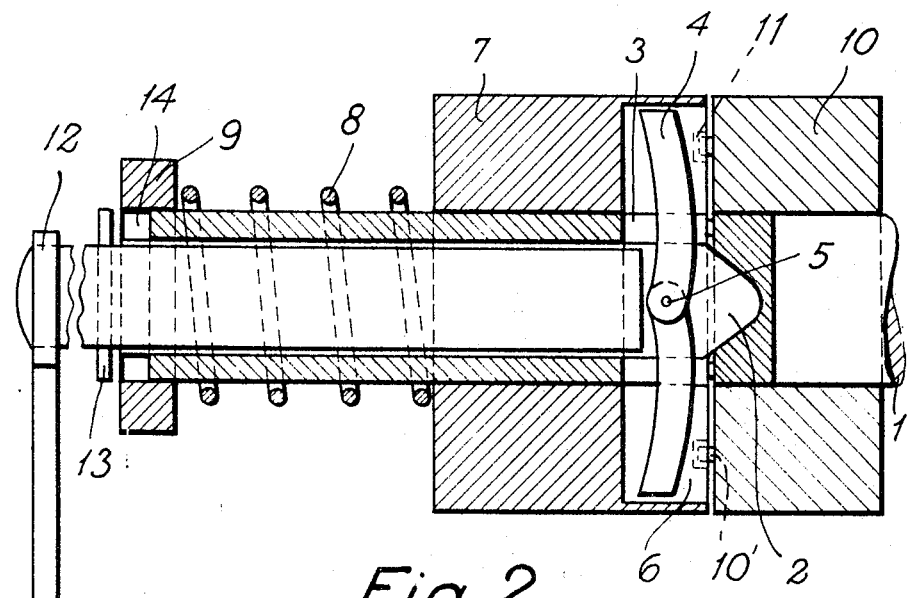
FIGURE 1 shows an axial section through an embodiment of the coupling mechanism according to the invention.
Figure 2:
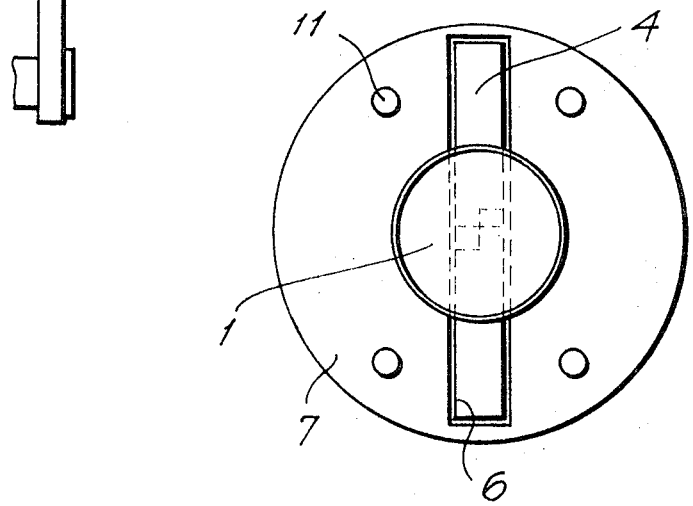
FIGURE 2 shows the driven coupling half of the mechanism, viewed from the side facing away from the shaft end.

In FIGURE 1 is shown one end of a rotatable shaft 1 with an axial bore 2. At a relatively short distance from the inner end of the bore its surrounding tube wall has two longitudinal diametrically opposed slits 3 into which a pair of curved pawls 4 hinged to each other are introduced so that their pivot 5 is at the center line of the bore and the shaft, and at their opposite ends the pawls 4 are mounted in narrow radial recesses 6 provided in a driven coupling half 7 which is displaceable in the longitudinal direction of the shaft 1, but is retained nonrotatably in relation to the shaft 1 by means of the pawls 4 and the slits 3. In the normal position, a spring 8 arranged around the shaft and resting against a ring 9 on the shaft forces the driven coupling half 7 into engagement with another coupling half 10 (indicated by stippled lines only) which is driven by a driving mechanism. The coupling halves may engage each other in any desired manner; the coupling may, for example, be formed as a claw coupling, or the driving coupling half may, as indicated, have pins 10' entering holes 11 provided in the driven coupling half.

When it is desired to rotate the shaft manually, or it is necessary to do so because of failure of the driving mechanism, a crank handle 12 is inserted into the bore 2 and a transverse pin 13 projecting on either side of the said handle is then engaged in corresponding notches 14, which for example, may be formed as a bayonet socket so that the crank handle 12 and the shaft 1 are coupled together and are non-rotatable in relation to each other. By the said movement of the crank handle 12, its inner end will be forced against the pawls 4 at the pivot 5 where they are hinged to each other, and the pawls will pivot as levers about the inner limiting edge of the slits 3, by which their extreme ends, overcoming the action of the spring 8, will force the driven coupling half 7 into a disengaged position to the left in FIG. 1, in which the pins 10' of the coupling half 10 are clear of the holes 11.

When the crank lever 12 is released, the spring 8 will again urge the coupling halves against each other, by which the pawls 4 are returned to their starting position so that the crank handle is forced out of its engagement with the shaft. When the driving mechanism is subsequently started, there will thus be no risk of the crank handle being driven in rotation.

In the embodiment of the coupling mechanism according to the invention shown in FIGURE 3 the driven coupling half 7', which is non-rotatably but displaceably connected with the shaft 1', is mounted at a greater distance from the shaft end than the driving, freely rotatable coupling half 10'. When the crank handle 12 is introduced into a position in which the carrier members 13 and 14 are engaged, its innermost end will force the coupling half 7' out of engagement with the coupling half 10' against the action of the spring 8'. The coupling half 7' is retained nonrotatably, but displaceably on the shaft 1' by means of a pin 15 passed through longitudinal slits 3' in the wall of the bore and into radial recesses 6' provided in the coupling half 7'. The coupling halves may have pins and holes as shown in the embodiment according to FIGURE 1, or the coupling may be formed as a conventional claw coupling or friction coupling.

I claim:

1. A coupling mechanism comprising a shaft with an axial bore at one end thereof, first and second coupling members mounted on said shaft, one of said coupling members being a drive member freely rotatable on said shaft, the other member being a driven member mounted on the shaft for common rotation therewith while being axially displaceable relative thereto, spring means acting on said coupling members to urge the same into driving engagement, an operating member insertable in said bore, means on said operating member for engaging said shaft in driving relation whereby manual rotation of the operating member will produce turning of the shaft, and means in part in said bore in the shaft and engaging said driven coupling member for displacing the same, against the action of the spring means, to disengage said coupling members, the latter means being positioned in said bore to be operated by said operating member before the means thereon has engaged the shaft in driving relation.

2. A coupling mechanism as claimed in claim 1 wherein said shaft has diametrically opposed slits and said means for disengaging said members comprises an element extending transversely of said shaft and through said slits into engagement with said driven coupling member.

3. A coupling mechanism as claimed in claim 2 wherein said operating member has a free end which is inserted into said bore, said end acting on the transversely extending element to produce disengagement of said coupling members, said means on the operating member for engaging the shaft being located at a distance from said free end such that said free end first contacts said transversely extending element to disengage said coupling members whereafter said means engages the shaft.

4. A coupling mechanism as claimed iin clam 2 wherein said transversely extending element comprises a pair of levers hingeably connected together within the bore, each lever extending through a respective slit and into a corresponding radial recess provided in said driven member.

5. A coupling mechanism as claimed in claim 4 wherein said driven member is located closer to said end of the shaft as compared to the drive member, said spring means acting between said shaft and said driven member.

6. A coupling mechanism as claimed in claim 2 wherein said slits have longitudinal extent in said shaft and the transversely extending element is longitudinally displaceable in the slits between a first position in which the coupling members are engaged and a second position in which the coupling members are disengaged.

7. A coupling mechanism as claimed in claim 6 wherein said transversely extending member is a pin extending through said slits and into radial recesses provided in said driven member.

8. A coupling mechanism as claimed in claim 6 wherein said drive member is located closer to said end of the shaft as compared to the driven member, said spring means acting between said shaft and the driven member.

References Cited

UNITED STATES PATENTS

| 1,002,898 | 9/1911 | Calkins. |
| 1,128,012 | 2/1915 | Levine. |
| 1,135,385 | 4/1915 | McClair. |
| 1,175,012 | 3/1916 | Putraw. |
| 2,193,012 | 3/1940 | Stein. |

FRED C. MATTERN, JR., Primary Examiner

F. D. SHOEMAKER, Assistant Examiner

U.S. Cl. X.R.

123—185